United States Patent Office 3,733,420
Patented May 15, 1973

3,733,420
BIOCIDAL OCTYLDODECYL DIMETHYL AMMONIUM COMPOUNDS IN HARD WATER SOLUTIONS
Reginald L. Wakeman, Philadelphia, Pa., and Edward G. Shay, Belle Mead, and Alfonso N. Petrocci, Glen Rock, N.J., assignors to Millmaster Onyx Corporation, New York, N.Y.
No Drawing. Original application Dec. 4, 1968, Ser. No. 781,238, now abandoned. Divided and this application Mar. 26, 1971, Ser. No. 128,532
Int. Cl. A61k 27/00; C02b 3/06
U.S. Cl. 424—329
4 Claims

ABSTRACT OF THE DISCLOSURE

A method of inhibiting microorganisms in hard water aqueous solutions by using in hard water, water-soluble unsymmetrical di-higher alkyl dimethyl ammonium salts having the structure:

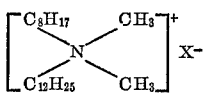

wherein X is a biocidally compatible anion preferably derived from a halogen such as bromine or chlorine. It is also possible to use methosulfate, although this is much less preferable because the resultant compound is not as effective and is also more difficult to make.

---

This is a division of co-pending application Ser. No. 781,238, filed Dec. 4, 1968, now abandoned. This invention relates to the biocidal use of the water-soluble unsymmetrical di-higher alkyl dimethyl ammonium salts having the structure:

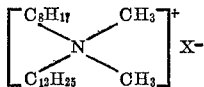

wherein X is a biocidally compatible anion preferably derived from a halogen such as bromine or chlorine. It is also possible to use methosulfate, although this is much less preferable because the resultant compound is not as effective and is also more difficult to make.

The term "hard water" is generally used to describe water having an appreciable amount of carbonates, bicarbonates, sulfates and chlorides of calcium and magnesium, and sometimes also of iron. The term "hard water" also includes the possible presence of alkaline earths and heavy metal ions in general. By "appreciable amount" is meant at least about 75 p.p.m. to about 500 p.p.m. Very hard water is that which contains over 1,000 p.p.m.

It is particularly important that such hard water resistant quaternaries be employed where the time of contact is short, as in the sanitization of utensils, for example in the dairy industry, restaurants and bars; in the washing of eggs, fruits and vegetables in order to prevent the spread of infection; and, in general, for sanitization wherever they can feasibly be used.

In accordance with the present invention, it has now been discovered that octyl dodecyl dimethyl ammonium salts which are water-soluble, and particularly their bromides and chlorides, and, to a lesser extent, their methosulfates, remain biocidally effective even in very hard water where the content of the contaminants is above 1,100 p.p.m. On the other hand, even closely related homologs show little biocidal effectiveness in hard water even where the amount of the contaminants is considerably lower.

The biocides of the present invention are effective in very hard water in a concentration of the biocide of between about 100 to 1,000 p.p.m. The preferred and most effective range is about 200 to 400 p.p.m.

The present compounds are all easily prepared in various manners. The following examples are illustrative of their preparation.

EXAMPLE 1

Equimolecular amounts of dodecyl dimethyl amine and octyl bromide were mixed with an amount of 99% isopropanol equal to about the combined weight of the amine and the bromide. The mixture was then heated at the reflux temperature (about 88° to 90° C.), and at atmospheric pressure, for a period of about eight hours, or until the reaction appeared to be complete. It was determined by argentometric titration that the yield was about 90% complete after five hours, and essentially complete (about 98–99%) when the reaction was continued overnight on the steam bath. The product was then cooled to room temperature and the concentration adjusted to 50 percent by weight by means of the addition of 99% isopropanol.

The resultant product was octyl dodecyl dimethyl ammonium bromide.

EXAMPLE 2

In the same manner as in Example 1, dodecyl bromide was reacted with octyl dimethyl amine, to yield the same products as that of Example 1.

EXAMPLE 3

In a similar manner to Examples 1 and 2, the corresponding alkyl chlorides were substituted for the alkyl bromides in each instance, and the reactions were carried essentially to completion to yield octyl dodecyl dimethyl ammonium chloride in each instance.

The aforesaid unsymmetrical quaternary ammonium compounds may also be prepared by a two-stage process, whereby the octyl dodecyl monomethyl amine is first prepared by the interaction of an alkyl halide and an alkyl monomethyl amine; after liberating the tertiary amine, by treatment with caustic, from its hydrohalide salt, the tertiary octyl dodecyl monomethyl amine is quaternized by reaction with an alkylating agent. This is illustrated in Example 4 as follows:

EXAMPLE 4

Equimolecular amounts of dodecyl monomethyl amine and octyl bromide were mixed with an amount of 99% isopropanol equal to about the combined weight of the amine and the bromide. The mixture was then heated at about 90° C., under agitation and under reflux, at atmospheric pressure, for a period of hours until the reaction was essentially complete as indicated by argentometric titration of the bromide ion. The solution was then mixed with about twice its volume of water plus about 1 to 1.2 molecular equivalent of NaOH. The liberated tertiary amine (octyl dodecyl monomethyl amine) was then separated in a separatory funnel, washed with water and dried.

EXAMPLE 5

The tertiary amine of Example 4 was quaternized by reaction with methyl chloride, in an agitated pressure vessel at about 90° C., in a medium of 99% isopropanol, along with about 3% of water and 0.5% of sodium bicarbonate. Methyl chloride was then passed into the vessel at such a rate as to maintain a pressure of less than 30 p.s.i. in the reactor, the addition of the methyl chloride being continued until no further reaction occurred, as indicated by failure of the pressure to fall when the methyl chloride supply was cut off.

About midway in the addition of the methyl chloride, an additional 0.5% of sodium bicarbonate was added, to take up any traces of HCl that might have been formed. Agitation and heating were then continued for about two hours longer.

The reaction mass was cooled to about 50° C., after which it was filttered to remove the salts. The concentration was then adjusted to 50% by the addition of 99% isopropanol, the resulting product being octyl dodecyl dimethyl ammonium chloride.

The corresponding bromide was prepared in a similar manner, by reacting the tertiary amine with methyl bromide at about 50–55° C., at about atmospheric presesure.

EXAMPLE 6

A process similar to Example 5 was used to obtain the corresponding methosulfate, except that the reaction was conducted at about 60° C. and dimethyl sulfate was used as the reactant.

In all the above examples, any desirable alcohol other than isopropanol may be used, or any other feasible solvent may be substituted.

The unexpectedly high biocidal activity in very hard water of the octyl dodecyl dimethyl ammonium salts of this invention is illustrated by the following table, in which their performance is compared with close homologous dialkyl dimethyl ammonium salts. The test method used was the "Methods of Analysis of the Association of Official Analytical Chemists, 10th Edition" published by that organization in 1965, and contained in pages 87–89.

The organism used was *Escherichia coli*, the inoculum containing a concentration of the organism in the order of 100,000,000 per milliliter.

TABLE I

Hard water tolerance (at 200 p.p.m. as quaternary chloride)

| Carbons in first alkyl | Carbons in second alkyl | H.W.T., p.p.m. |
|---|---|---|
| 6 | 12 | 300 |
| 6 | 14 | 550 |
| 6 | 16 | 400 |
| 6 | 18 | 400 |
| 8 | 10 | <300 |
| 8 | 12 | 1,200 |
| 8 | 14 | 750 |
| 8 | 16 | <300 |

The products of this invention also possess the advantage of diminished foaming in dilute solution. In swimming pools, for example, foaming produced by the agitation of the water surface by divers and swimmers is undesirable. Algacidal quaternaries so used generally tend to cause foaming. This low-foaming characteristic is also a distinct advantage in industrial water treatments, such as in cooling towers and air conditioners.

In the following foam test at room temperature, a Waring blender was used to produce a foam by charging 100 ml. of a solution containing 100 p.p.m. in tap water, running the blender at top speed for 30 seconds, stopping the blender and immediately measuring the height of the foam above the liquid level.

| Product: | Foam height, in mm. |
|---|---|
| Octyl dodecyl dimethyl ammonium chloride | 6 |
| BTC 2125 (Onyx Chemical Co.) (a mixture of alkyl dimethyl benzyl ammonium chloride and alkyl dimethyl ethylbenzyl ammonium chloride in equal parts by weight) | 50 |

The products of this invention may be used for the disinfection or sanitization of hard surfaces; for the sanitization of textile and other fabrics; as topical antiseptics; in water treatment; and for other bactericidal, fungicidal and algacidal purposes where quaternary ammonium compounds are compatible.

When mixed with an equal amount of a non-ionic surfactant, such as alkylphenol ethoxylate, the products of this reaction retain a substantial proportion of their efficacy. They also remain substantially potent in the presence of small amounts of anionic surfactants, or of protein.

The invention claimed is:

1. A method of disinfecting a surface which comprises applying to said surface a biocidally effective amount of a compound having the structure:

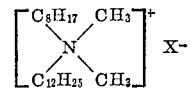

wherein the $C_8H_{17}$ and $C_{12}H_{25}$ moieties are straight chain, and X is chlorine, bromine or methosulfate, dissolved in hard water.

2. A method of disinfecting hard water which comprises admixing with said hard water a biocidally effective amount of a compound having the structure:

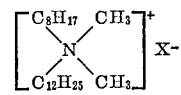

wherein the $C_8H_{17}$ and $C_{12}H_{25}$ moieties are straight chain, and X is chlorine, bromine or methosulfate.

3. A disinfecting composition consisting essentially of a solution in hard water of a compound having the structure:

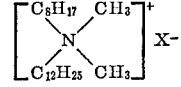

wherein the $C_8H_{17}$ and $C_{12}H_{25}$ moieties are straight chain, and wherein X is chlorine, bromine or methosulfate, said compound being present in a concentration of about 100–1000 p.p.m.

4. The composition of claim 3 wherein the concentration of said compound is about 200–400 p.p.m.

References Cited

Shibata et al.: Chem. Abst., vol. 48 (1954), p. 4772f.

SAM ROSEN, Primary Examiner

U.S. Cl. X.R.

210—64